(No Model.)

O. LADE.
PLOW CLEVIS.

No. 588,583. Patented Aug. 24, 1897.

WITNESSES:

INVENTOR
Otto Lade

BY
ATTORNEY

UNITED STATES PATENT OFFICE.

OTTO LADE, OF MERRILL, MICHIGAN.

PLOW-CLEVIS.

SPECIFICATION forming part of Letters Patent No. 588,583, dated August 24, 1897.

Application filed August 24, 1896. Renewed July 6, 1897. Serial No. 643,615. (No model.)

*To all whom it may concern:*

Be it known that I, OTTO LADE, a citizen of the United States, residing at Merrill, in the county of Saginaw and State of Michigan, have invented certain new and useful Improvements in Plow-Clevises; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to plow-clevises; and it consists in the novel arrangement, combination, and adjustment hereinafter described and claimed.

Figure 1:
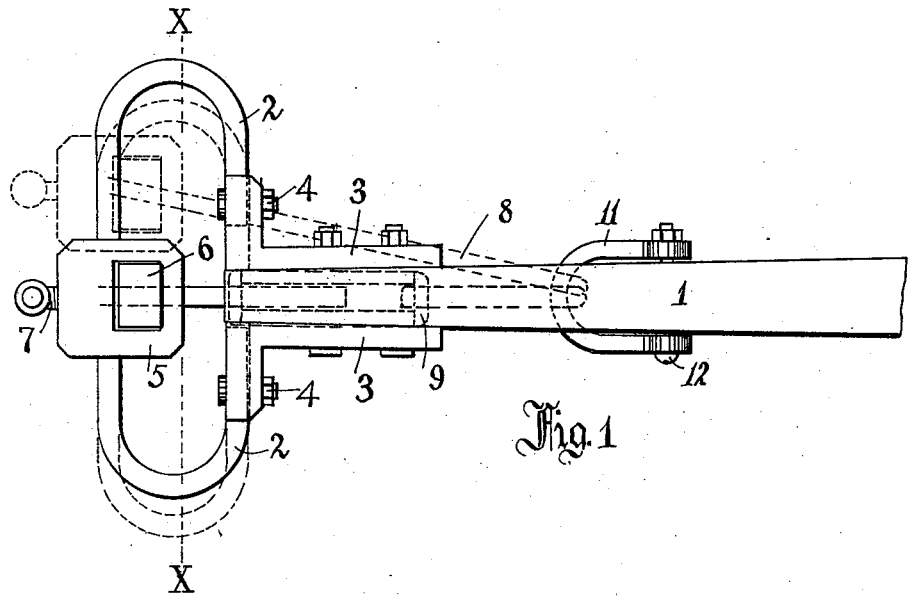
Figure 2:
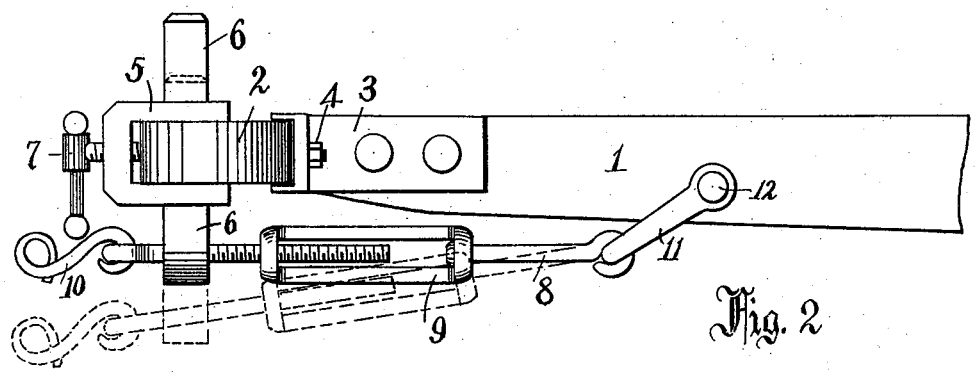
Figure 3:
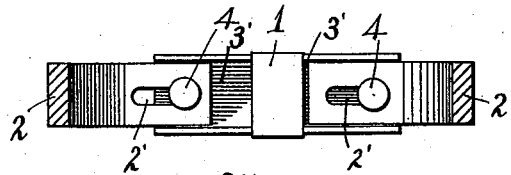

Figure 1 is a top plan view. Fig. 2 is a side elevation. Fig. 3 is an end view, in part sectional, on line X X of Fig. 1.

In the drawings, 1 is the plow-beam of ordinary construction and has upon each side of the end the L-shaped braces 3 3, extending laterally therefrom. The ends of these braces are provided with guides 3', as shown in Fig. 3, for the purpose of receiving the end of the oblong loop 2 transversely across the end of the beam and secured in these guides by the bolts 4 4, passing through the horizontal slots 2' in the loop 2.

The loop 2 is formed, as will be seen, by bending a bar into an elliptical shape with the ends of the bar some distance apart, so as to permit a lateral adjustment in the guides 3' by moving the loop therein, the bolts 4, passing through the slots mentioned, holding the loop in the position to which it may be adjusted.

5 is a yoke adapted to fit over the loop on the outside thereof, the arms of the yoke being provided with holes, through which a vertical bar 6 passes inside of the loop. A set-screw 7, passing through the yoke, draws this bar 6 against the inside of the loop and holds the yoke in position on the loop. This bar 6 may be moved up and down through the arms of the yoke by loosening the set-screw 7, and when adjusted again tightening the screw holds it securely in the position to which it may be adjusted.

The bar 6 carries on its lower end the draw-bar 8 underneath the plow-beam and attached to the plow-beam in front of the colter by the clevis 11 and the bolt 12, passing through the ends of the clevis and the beam.

The yoke 5 may be adjusted laterally on the loop 2 by loosening the set-screw and sliding the yoke along on the outer edge of the loop. If after the yoke has been moved to the extreme end of the loop it is desirable to have the draft still farther out from the beam, the loop may be adjusted in the guides 3', as previously described.

10 is a device on the end of the draw-bar for engaging the whiffletree.

9 is a swivel on the draw-bar 8, constructed as is common, and is for the purpose of permitting the whiffletree to remain in a horizontal position when the plow is turned down, as is usual when turning corners or when being drawn along and not in use. Without this swivel attachment it is obvious that when the plow is turned down one end of the whiffletree will be thrown up and the other end plow along through the earth.

By means of the clevis and the attachment described I am enabled not only to regulate the width of the furrow, but also the depth, the width being regulated by sliding the loop 2 in the guides 3'. The depth is regulated by lowering the bar 6 through the arms of the yoke, as described. I am aware that similar means have been devised for accomplishing this same purpose and that a loop has been used with the yoke, as specified, but I am not aware of any means of adjusting the loop on the end of the plow-beam that has heretofore been used, and I am not aware that a swivel draw-bar has been used in this connection.

Having thus described my invention, what I claim as new, and desire to secure by Letters Patent, is—

1. In a plow, the combination with means for regulating the depth of the furrow, comprising a pin carrying the draw-bar adapted to be raised up and down and held in the position adjusted, and means for regulating the width of the furrow, comprising a horizontal loop engaged by the means regulating the depth of the furrow, whereby the means for regulating the depth of the furrow may be moved laterally on the loop, of additional means for regulating the width of the furrow comprising longitudinal slots in the horizontal loop on the side adjoining the end of the plow-beam, and bolts passing through the slots and adapted when tightened to hold the loop in the position to which it may have been moved on the bolts, substantially as and for the purpose set forth.

2. In a plow, the combination with the plow-beam having secured upon the end thereof horizontal guideways, of a loop adapted to fit in said guideways and to be adjusted therein longitudinally, a yoke adapted to slide longitudinally on the loop and to be secured thereto in any position desired, a vertical pin carrying a draw-bar and passing through the arms of the yoke, and adapted to be clamped with the yoke at the desired height in the desired position on the loop, and a swiveled draw-bar supported by the vertical pin and secured to the plow-beam in the rear of the clevis, substantially as and for the purpose set forth.

In testimony whereof I affix my signature in presence of two witnesses.

OTTO LADE.

Witnesses:
A. H. SWARTHOUT,
Mrs. E. W. BALLENTINE.